United States Patent [19]
Thompson

[11] 3,813,049
[45] May 28, 1974

[54] TIRE CHAIN

[76] Inventor: Robert L. Thompson, 9930 Bacamora Ave., Whittier, Calif. 90603

[22] Filed: Oct. 20, 1972

[21] Appl. No.: 299,409

[52] U.S. Cl. ............................ 152/241, 152/255 R
[51] Int. Cl. ........................................ B60c 19/00
[58] Field of Search ............ 152/241, 225 R, 225 C, 152/213

[56] References Cited
UNITED STATES PATENTS

| | | | |
|---|---|---|---|
| 1,119,844 | 12/1914 | Leigh | 152/213 R |
| 2,119,447 | 5/1938 | Stahl et al. | 152/225 C |
| 2,154,047 | 4/1939 | Krider | 152/225 C |
| 2,176,631 | 10/1939 | Kunkle | 152/241 |
| 2,474,262 | 6/1949 | Linderme | 152/225 C |
| 2,532,380 | 12/1950 | Tschohl et al. | 152/225 C |
| 3,289,727 | 12/1966 | Marks | 152/225 C |

Primary Examiner—Robert G. Sheridan
Assistant Examiner—Kenneth Noland
Attorney, Agent, or Firm—J. C. Baisch

[57] ABSTRACT

The present invention relates to a tire chair; and more particularly relates to an emergency type tire chain that may be easily installed for adverse driving conditions, provides improved ride characteristics over prior art tire chains, and may be easily removed. The disclosed chain is designed so that high tensile elements thereof are automatically tightened onto the tire without any effort on the part of the auto owner. Once the adverse driving conditions have cleared up, the disclosed tire chain is easily removed.

11 Claims, 7 Drawing Figures

PATENTED MAY 28 1974 3,813,049

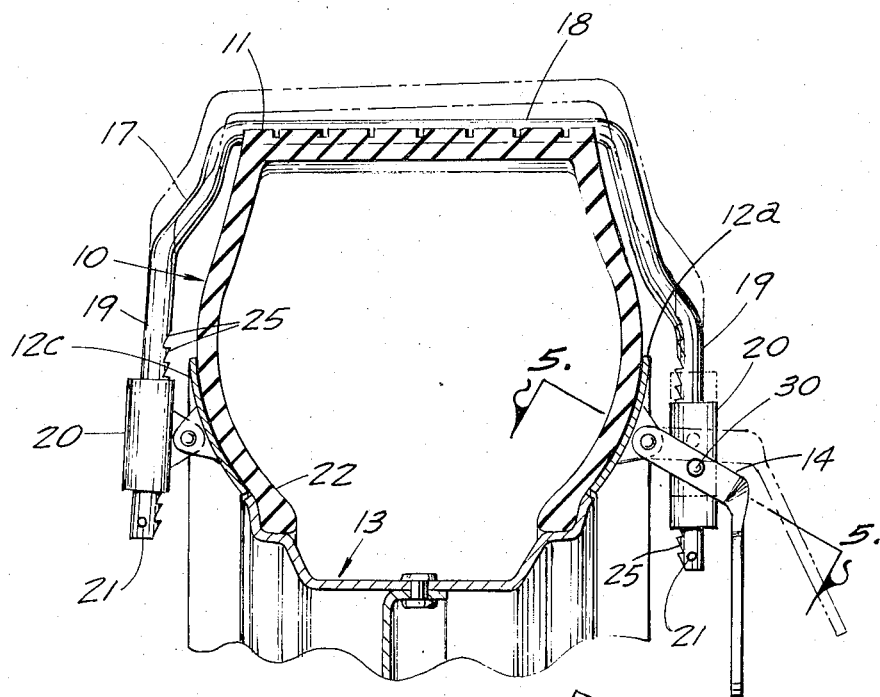
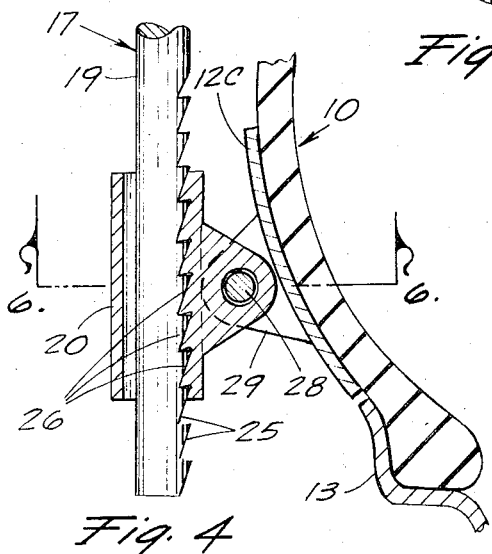
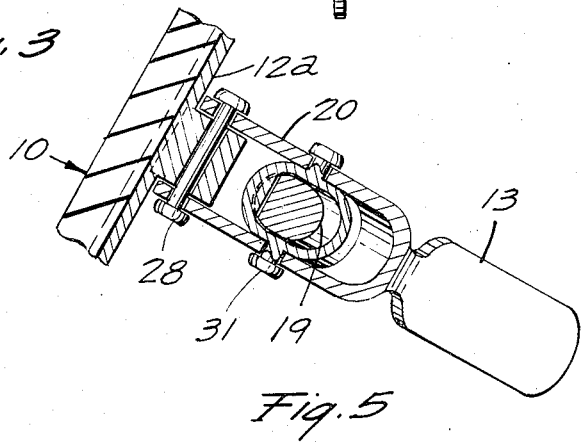
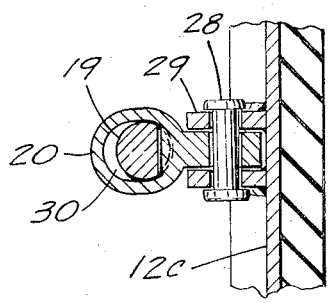
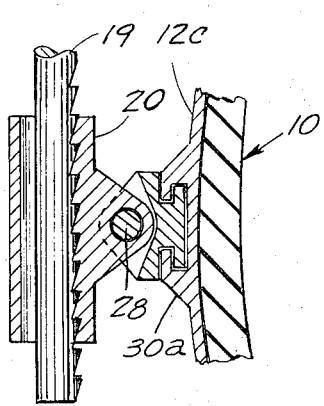

3,813,049

TIRE CHAIN

BACKGROUND

It is well known that the usual automobile uses tires whose peripheral "tread" portions engages the road way to provide the desired traction. Unfortunately, under adverse conditions of snow, ice, mud, etc., the traction is very unsatisfactory; but it has been learned that "anti-skid" devices positioned transversely across the tread portion of the tire, increases the traction under these adverse conditions. (It should be noted that the so-called anti-skid device actually serves two purposes; namely, minimizing the skidding of moving vehicles, and providing traction in the above disclosed adverse driving conditions) As a result, many anti-skid devices have been introduced.

The most satisfactory anti-skid device comprises a plurality of traction elements — such as strips, cross-chains, or the like — positioned transversely across the tread portion of the tire; the so-called "cross-chains" providing optimal anti-skid characteristics and optimal tractions for starting in snow, ice, mud and the like.

Most anti-skid devices comprise chains in ladder-type configuration; that is, having two parallel spaced apart side chains with transverse cross chains positioned to form the "rungs" of the ladder configuration, the ends of the cross chains being affixed to suitable locations of respective side chains. The easiest way to install these "full" chains onto a tire, is to spread out the chain ladder configuration behind or in front of the tire, in alignment with the track that the tire is to follow; and to then drive the tire onto the chain ladder. Now, the ends of the chain ladder are folded over the tire, and the ends of the chain ladder are attached to each other. In this way, the cross chains are positioned transversely of the tires tread portion, and suitable springs are used to hold the side chains tautly in place.

One of the more difficult operation of the chain installation is that of reaching around to the back side of the tire in order to attach the ends of the side chains to each other; this operation being difficult enough during dry weather — and being almost impossible under adverse conditions of snow, ice, cold, mud, and the like.

The problem of chain installation becomes immeasurably worse under emergency conditions — such as during a snow storm; while the car is snowed in so that the tires are difficult to reach; while the tire mored in mud; when the car is unable to produce enough traction to drive onto the chain; and so forth. In order to handle such adverse or emergency conditions of chain installation, many types of "emergency" chains were proposed; but, unfortunately, none of them proved entirely satisfactory.

Most of these emergency chains require fumbling around in back of the tire, with the attendant exposure to snow, ice, cold, mud, and the like. Some of these emergency chains require elements to be permanently welded to the tire rims thus introducing possible problems of unsprung weight, and possibly unbalanced centrifugal forces. Other emergency chains require deflation and reinflation of the tires — a difficult procedure in an emergency. Still other emergency chains require the hooking of chains into slots — another difficult procedure for bare hands or gloved operation. Still other emergency chains require the stretching of springs or the like.

Moreover, many of the emergency chains use traction elements that produce a very bumpy ride; As a result, when the car was then exposed to another emergency condition — such as a new snow fall, and icing-over of melted snow, a new mud area or the like — the tires were no longer equipped to handle the new emergency situation.

Thus, as many be understood, an improved emergency chain for tires is still needed.

OBJECTIVES AND DRAWINGS

It is, therefore, the principal objective of the present invention to provide an improved tire chain.

It is another objective of the present invention to provide an improved tire chain that is easy to install and to remove.

It is still another objective of the present invention to provide an improved tire chain that produces better riding characteristics.

It is a further objective of the present invention to provide an improved tire chain that is easily repaired when this becomes necessary.

It is still a further objective of the present invention to provide an improved tire chain that is economical to produce and maintain, and efficient in operation.

The attainment of these objectives and others will be realized from a study of the following specifications, taken in conjunction with the drawings, of which:

FIG. 3 shows a transverse partially crosssectional view of the relation between the tire and the subject tire chain;

FIG. 4 shows a side cross-sectional view of one of the automatic tightening mechanism of the subject tire chain;

FIG. 5 shows a top cross-sectional view of another automatic tightening mechanism of the tire chain;

FIG. 6 shows a cross-sectional view of the locking mechanism of the subject tire chain;

FIG. 7 shows a cross-sectional view of an alternative automatic tightening mechanism of the subject tire chain.

SYNOPSIS

Broadly speaking, the subject tire chain comprises a pair of pressure plates that are locked into position on either side of the tire; simple toggle type locking handles being used to lock the pressure plates in position. A set of cross chains is attached to the pressure plates in such a way that the cross chains are positioned transversely of the tread portion of the tire; thus providing the desired traction — cross chains being highly efficient and easily replaceable. One or more tensile elements are automatically tightened onto the pressure plates, with flat portions of the tensile elements positioned transversely across the tread-portion of the tire. Due to the automatically tightening of the tensile element, its flat portion is embedded into the tread portion of the tire; and thus helps to position the pressure plates, and to soften the riding qualities.

INTRODUCTION

As indicated above, it is extremely desirable to provide an improved emergency tire chain that may be easy to install, provides efficient traction, may be easily removed, and provides improved riding characteristics while it is being used. These characteristics (1) cause the operator to be more inclined to install chains when adverse conditions are encountered, which could be considered an important safety factor; and (2) encourage the operator to leave the emergency tire chains on the car, so that the car is already equipped for an adverse driving condition if another such should be encountered. The subject invention provides this desideratum, as will be realized from the following discussion.

BASIC PRINCIPLES

Figure 1:
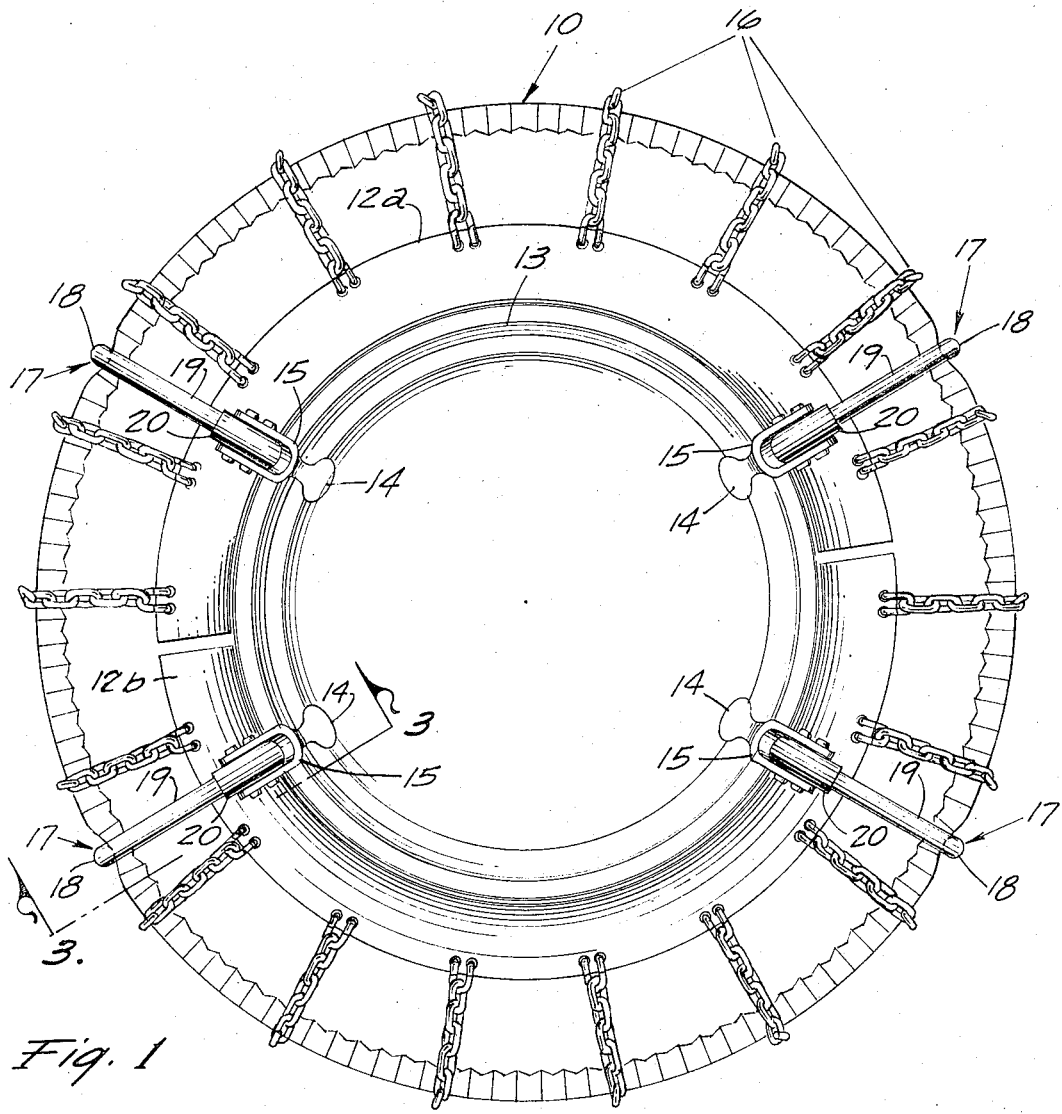
FIG. 1 shows a view of the outside of a tire having the subject tire chain installed thereon.

FIG. 1 shows a view of the outer side of a tire 10 having a tread portion 11 that normally engages the road to provide traction for moving the automobile. In FIG. 1, a plurality of "outer" pressure plates 12a and 12b are "locked" into position below the "bulge" of the tire 10 and above the rim 13, at the outer side of the tire — in a manner to be discussed later; locking handles 14 and yokes 15 being part of the locking mechanism.

A plurality of individual transversely positioned traction elements, such as cross chains 16, have their outer ends affixed to the outer pressure plates 12, as by being hooked therethrough.

It will be noted that FIG. 1 shows two arcuate pressure plates 12a and 12b; but as will be explained later, many desired sizes and/or shapes of pressure plates may be used.

Figure 2:
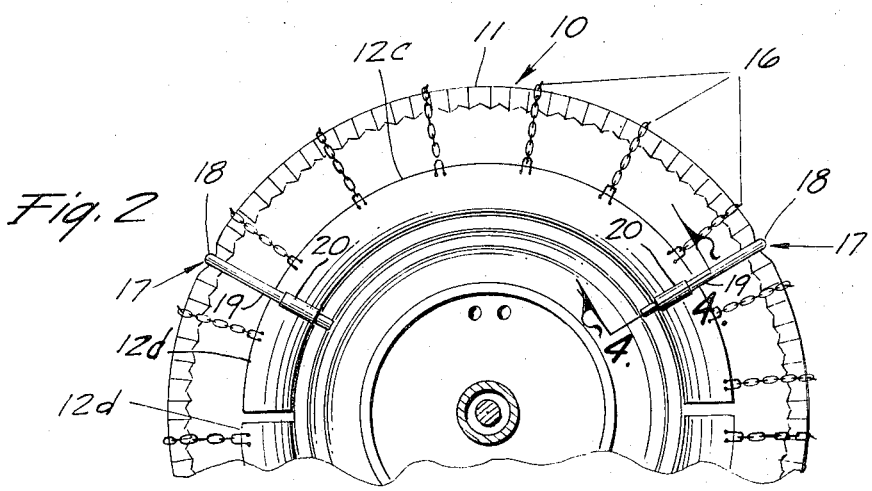
FIG. 2 shows a view of the back side of a tire having the subject tire chain installed thereon.

FIG. 2 shows a partial reduced size view of the back side of tire 10; a like plurality of "inner" pressure plates 12c and 12d being locked into position below the bulge of the tire 10 and the tire rim 13, at the back side of the tire 10 — in a manner to be discussed later. It will be noted that there are no locking handles associated with the inner pressure plates.

Individual traction elements, such as cross chains 16, have their inner ends affixed to the inner pressure plates 12c and 12d, as by being hooked therethrough.

THE LOCKING ARRANGEMENT

Referring now to FIG. 3, it will be seen that this drawing shows the tire 10 to have a somewhat circular cross section, its "bead" portions 22 setting themselves into channel portions of the tire rim 13. The widest portion of the tire is known as the tire bulge; and FIG. 3 shows the pressure plates 12a and 12c in their locked positions — that is, locked in the "near bead" positions between the bulges of the tire 10 and the respective lips of the tire rim 13. The locking arrangement functions as follows:

When the chain apparatus is originally installed on the tire, the ends of the legs 19 traverse tightness adjusters 20; and have their terminations such as pins 21, locking nuts, or the like adjacent to the ends of tightness adjusters 20, as indicated by the dotted line representation of FIG. 3. At this time, the inner pressure plate 12c is positioned at the near bead area as indicated; the shape of the tire and the rim lip tend to properly position the inner pressure plate 12c. At this time, as indicated by the dotted line representation, the over-center or toggle locking handle 14 is in its released position, to place the outer pressure plate 12a at its inner bead area between the bulge of the tire and the lip of the rim 13. A U-shaped tensile element 17 takes the position indicated in the dotted line representation.

Now, the locking handle 14 is rotated to its locking position shown in the solid line representation of FIG. 3; this locking movement of the locking handle 14, and the resiliency of the tensile element 17 tends to securely position both of the pressure plates 12.

It will be realized that a plurality of tensile elements 17 are used; and that each of the tensile elements has two similar legs 19. Therefore, for simplicity and ease of explanation, the following presentation will be given in terms of one leg, its structure, and its action; but it should be realized that such an explanation applies equally to all such tensile elements.

Thus, both pressure plates are now simultaneously locked in position between their respective rim lips and the bulges of the tire with the tensile element 17 positioned rather loosely (not shown) in the tightners 20, and with its "flat" portion extending slightly outwardly of the tread portion 11 of the tire 10.

THE TIGHTENING ARRANGEMENT

Referring to FIGS. 1 and 2 again, it will be seen that these illustrations show a plurality of tensile elements 17; the flat portion 18 of the tensile element 17 fitting across the tread portion 11 of the tire, and the leg portions 19 of the tensile elements 17 pointing radially inward of the tire; the ends of the legs 19 being received in tightness adjusters 20.

If desired, spring or a clamp may be used to hold the locking handle 14 in place.

Due to the co-action (to be explained later) of the tightners 20, and the ends of the legs 19, the transverse portions 18 of the tensile elements 17 are gradually drawn into the tread 11 of the tire; so that the transverse flat portion 18 is substantially embedded into the tread of the tire 10.

As the tire 10 now rolls along the road, the embedded flat portions 18 has a negligable effect on the riding qualities; the cross chains 16 and the tread 11 providing the desired traction. In this way, the subject invention provides optimal traction and minimal ride discomfort.

In FIG. 3, the solid line represented shows the tensile element 17 to be positioned in such a manner that its flat portion 18 is substantially embedded into the tread 11 of the tire; and this result is achieved as follows:

As the flat 18 is pressed toward the tire 11 (by hand pressure or by the weight of the car due to the rotation of the tire), the ends of both legs 19 move farther into the tighteners 20; and engagement means — such as the illustrated ratchet teeth 25 of legs 19 and the not illustrated ratchet 26 of tighteners 20 — engage each other; and thus prevent the flat 18 from moving outwards. In this way, flat 18 is gradually and automatically embedded into tread 11; the extent of eventual embedment of the flat 18 into the tread 11 depending upon the weight of the car, the type and amount of tread, the size and dimensions of flat 18, etc.

In this way, tensile elements 17 are progressively tightened onto the pressure plates 12 and thus onto tire 10. Any number of tensile elements may be used for secure installation of the pressure plates. Once the flat 18 is suitably and automatically tightened and embedded, the pressure plates 12a and 12c are even more securely locked in place below the bulge of the tire — by resiliency and tension of the tensile elements, by the engagement of the ratchet teeth, by the inflation of the tire, by the angle of the bulge, by the area of the pressure plate, etc. Thus, referring again to FIGS. 1 and 2, the inner and outer pressure plates 12 are now securely locked in place; and as a result, the cross chains 16 — which have their ends anchored to respective pressure plates — are also firmly anchored in place.

As indicated above, it is highly desirable to have the cross chains transversely positioned across the tread portion of the tire, but it has been found that for more efficient operation, the cross chains should be snug but not tight — and this effect is achieved by having the cross chains at suitable length. A cross chain may be placed just in front of each tensile element, in order to minimize the impact produced by the tensile element contacting the road.

The actual ratching tightening action will be better to understood, from FIG. 4, which is a side cross sectional view of the tightening arrangement for the inner portion of the tire chain assembly. First of all, it will be noted that the leg 19 of the tensile element 17 fits somewhat loosely in the tightener 20; and that the inflation pressure of the tire 10 produces an outward pressure on the pressure plate 12c. The pressure plate 12c, acting through a pivot pin 28 and a mounting lug 29, causes the tightener's ratchet teeth 26 to engage the leg's ratchet teeth 25. Now, as a tensile element 19 moves radially inward (downward in the illustration), the combined action of the tensile element resiliency and the tire inflation resiliency permit a ratcheting movement; and as a result, the tensile element leg 19 moves further into its tightener 20 in a ratcheting manner.

It will be noted that the angle of the ratchet teeth and the gap 30 between the outer surface of leg 19 and the inner surface of tightener 20 facilitate the ratcheting movement. In this way, the flat portion of the tensile element 17 is gradually embedded into the tread portion of the tire. As a result of this ratcheting movement, the pressure plates 12 are gradually and evenly locked more securely in position as illustrated; and the cross chains 16 attached to the pressure plates 12 are gradually and evenly snugged down onto the tire tread.

The pivot pin 28 facilitates the seating of the pressure plate 12 against the tire, and eases the ratcheting movement as discussed above.

FIG. 5 shows a top cross sectional view of the locking mechanism previously discussed in connection with FIG. 4; and clarifies the location of the gap 30 between the leg 19 and the tightener 20, and indicates the relation of the pivot pin 28 to other elements of the locking mechanism.

FIG. 6 shows a similar cross sectional view of the locking mechanism at the outer pressure plate 12a; showing the locking handle 14 and a second pivot pin 31 that permits placing the locking assembly in its released position.

As discussed above, when the tensile elements 17 and the pressure plates 12 have been securely tightened in place, the flat portions 18 become firmly embedded into the tread portion 11 of the tire; and, as a result, the entire chain assembly is tightly positioned. However, under some conditions — such as use with the so-called "slick" tires, tires with soft-rubber tread portions, etc. — there may be a tendency for the flat portions 18 to move slightly in a peripheral direction along the tread, as the flat portions contact the roadway.

In order to permit this peripheral movement, it may be desirable to use an additional pivot pin or a similar mechanism; and FIG. 7 shows a suitable arrangement. The mechanism of FIG. 7 is similar to that previously discussed; except that the mounting lug 30a is not affixed to the pressure plate 12c. Rather, the illustration of FIG. 7 shows that there is a tongue-and-groove interlinkage that permits the mounting lug 30a, the tightener 20, and the enclosed tensile element leg 19 to slide slightly relative to the securely positioned pressure plate 12c. In this way, the peripheral movement is accommodated.

MISCELLANEOUS CONSIDERATIONS

It will be noted that the tensile elements 17 are shown to be substantially U-shaped with slightly diverging legs — as this particular shape permits the tensile element to more easily fit over tires of various sizes, cross sectional shapes, etc. Moreover, the disclosed U-shaped tensile elements adapt themselves to new tires and the worn tires. It has been determined that a standardized size and shape of a tensile element will accept most of the standard tires; and that only a minimal number of different tensile element sizes and shapes are necessary to receive the other standard tires.

It has been found that the tensile element 17 preferably should have a round cross section; such a round cross section has a number of advantages. First of all, a round cross sectional rod is readily available from commercial sources. Secondly, a round cross section permits easy formation of the ratchet teeth thereon. Third, such a round cross section tensile element permits the use of the easily formed tightener 20. Finally, such a round cross section tensile element has a flat 18 that wears in such a way that there are no sharp edges produced that may damage the roadway.

The illustrations show a tightening arrangement wherein leg 19 has a round cross section and external ratchet teeth whereas the tightener 20 has an oval shaped aperture with internal ratchet teeth — obviously, these may be reversed, or other arrangements used.

It is preferable that the inner surface of the pressure plates be relatively smooth and formed to approximately fit the inner bead contour of the tire, in order to minimize tire damage due to scuffing of the pressure plates against the surface of the tire. Moreover, the size, area, etc. of the pressure plates should be such that the pressure applied to the tire bead portion is approximately equal to the internal pressure produced by the inflation of the tire.

INSTALLATION OF THE TIRE CHAIN

As it may now be realized, the disclosed invention comprise a tire chain assembly having an arcuate inner pressure plate, an arcuate outer pressure plate, a plurality of cross chains having their ends attached to respective ones of said pressure plates, one or more substantially U-shaped tensile elements, and a locking mechanism. To install such a tire chain assembly, the locking handle 14 is placed in its released position; and the tighteners 20 are positioned at the ends of their tensile element legs 19. The inner pressure plate 12c is allowed to drop along the inside of the tire, the cross chains 16 and the tensile elements 17 are positioned atop the tread portion of the tire, and the outer pressure plate 12a is allowed to drop along the outside of the tire. The locking handle 14 is then moved to its locking position; and the assembly is thus installed. As the tire rotates, the weight of the car causes the ratcheting action to gradually tighten the tensile element in place; and the installation is completed.

Whereas the above disclosure indicates the use of two such tire chain assemblies, one assembly may be enough to provide the desired traction in some conditions; alternatively three or more such tire chain assemblies may be used in other conditions.

REMOVAL OF THE TIRE CHAIN

In order to remove the tire chain, the locking handle 14 is placed in its released position. With the locking handle 14 in its released position, each pressure plate is thus removed from proximity with its associated tire wall; and this relaxation permits each leg 19 to be moved out of engagement with the ratchet teeth of the adjustors 20, and to move into the gap 29 that formerly existed between the leg 19 and the tightener 20. This relieved engagement permits the tensile element 17 to free itself from the tire tread; and a slight rotation of the wheel causes the tire chain assembly to fall off.

SUMMARY

The disclosed invention has innumerable advantages over prior art devices. The subject tire chain may be installed with a minimum of effort or inconvenience, and may be removed easily and promptly when no longer required. It is not necessary to reach around to the back side of the tire for either installation or removal. The tire does not have to be deflated or inflated for installation of the subject tire chain. No individual tension adjustment is necessary for the individual cross chains or for the overall assembly. It is not necessary to support the assembly or its weight while either installing it or removing it. No welding or bolting is necessary to either install or remove the subject tire chain. The disclosed pressure plates provide a large secure locking area. The tensile elements may be of any desired cross sectional shape, size or material. Any desired number of tensile elements may be used for the necessary locking action and traction. The present invention automatically tightens itself to the necessary amount. The present invention automatically positions its various elements in their proper places. The present invention may be installed under extremely adverse conditions. The subject invention has relatively good riding characteristics. The desired amount of traction may be obtained by using any desired number of cross chains. The cross chains are easily replaced when necessary. The tensile elements are easily replaced when necessary. The dislosed tire chain produces minimal highway impact. The cross section shape of the tensile elements may be such as to minimize the production of sharp cutting edges that might be detrimental to the roadway. The disclosed invention does not add any weight or unbalancing conditions to the original tire equipment. The disclosed invention does not add any unbalancing considerations to the original tire equipment. The disclosed invention does not require any spring-like tensioners. The cross chains are economical, efficient and easily replaceable as a replaceable units. The disclosed invention may be used on tubeless tires. The holding elements automatically position themselves as the tire wears. Finally, the disclosed invention does not require any modification of the original tire/rim assembly.

What is claimed is:

1. A tire chain assembly comprising:
   an outer pressure plate adapted to fit against a near bead section of the outer side of a tire;
   an inner pressure plate adapted to fit against the near bead section of the inner side of said tire;
   means for simultaneously locking said pressure plates against respective said near bead sections of said tire;
   a plurality of individual traction elements positioned tranversely across the tread portion of said tire;
   one end of each individual traction elements being attached to said inner pressure plate the other end of each of said individual traction elements being attached to said outer pressure plate;
   at least one tightener attached to each pressure plate;

and at least one tensile element having a flat portion and two leg portions:
   one end of one of said leg portions being received in said tightener of said inner pressure plate;
   the end of the other of said leg portions being received in said tightener of said outer pressure plate.

2. The invention of claim 1 wherein said flat portion of said tensile element is positioned transversely across the tread portion of said tire.

3. The invention of claim 2 including means for causing said flat portion of said tensile elements to be substantially embedded into the tread portion of said tire.

4. The invention of claim 2 including means for causing the weight of the automobile to embed said flat portion of said tensile element into the tread portion of said tire.

5. The invention of claim 1 wherein said tensile element is substantially U-shaped, and has slightly divergent leg portions.

6. The invention of claim 1 wherein said leg portions have external ratchet teeth, and said tighteners have internal ratchet teeth;
   said ratchet teeth of said leg portions being adapted to engage said ratchet teeth of said tighteners.

7. The invention of claim 1 wherein tensile element has a substantially circular cross section and said tightener has a substantially oval-shaped opening.

8. A tire chain assembly comprising:
   an outer arcuate pressure plate adapted to fit against a near bead section of the outer side of a tire;
   an inner arcuate pressure plate adapted to fit against the near bead section of the inner side of said tire;

means for simultaneously locking said pressure plates against respective said inner bead sections of said tire;
   a plurality of individual cross chains positioned transversely across the tread portion of said tire, one end of each individual cross chains being attached to said inner pressure plate, the other end of each of said individual cross chains being attached to said outer pressure plate;
   at least one tightener attached to said outer pressure plate;

at least one tightener attached to said inner pressure plate;

at least one substantially U-shaped tensile element having a flat portion and two leg portions, one ends of one of said leg portions being received in said tightener of said inner pressure plate, the end of the other of said leg portions being received in said tightener of said outer pressure plate, said flat portion of said tensile element being positioned transversely across the tread portion of said tire;

tightening means for causing said flat portion of said tensile element to be substantially embedded into the tread portion of said tire.

9. The invention of claim 8 wherein said tensile element has a substantially circular cross section, and said tightener has a substantially oval-shaped opening.

10. The invention of claim 9 wherein said leg portions have external ratchet teeth and said tighteners have internal ratchet teeth, said ratchet teeth of said leg portions being adapted to engage said ratchet teeth of said tighteners.

11. The invention of claim 8 wherein said locking means comprises a toggle type locking handle.

* * * * *